United States Patent [19]

Sato et al.

[11] 4,016,584
[45] Apr. 5, 1977

[54] SHUTTER CHARGE DEVICE FOR LENS SHUTTER IN A CAMERA HAVING A FOCAL PLANE SHUTTER AND PERMITTING LENS INTERCHANGE

[75] Inventors: Akihiko Sato; Yoshiyuki Nakano, both of Tokyo, Japan

[73] Assignee: Nippon Kogaku K.K., Tokyo, Japan

[22] Filed: Nov. 12, 1975

[21] Appl. No.: 631,306

[30] Foreign Application Priority Data

Nov. 28, 1974 Japan ............ 49-135917[U]

[52] U.S. Cl. .................... 354/295; 354/204; 354/233; 354/236
[51] Int. Cl.² ......................... G03B 11/00
[58] Field of Search .......... 354/202, 204, 233, 236, 354/251, 295

[56] References Cited

UNITED STATES PATENTS

| 2,736,251 | 2/1956 | Sachsinger | 354/204 |
| 2,791,164 | 5/1957 | Faulhaber | 354/204 |

*Primary Examiner*—John Gonzales
*Attorney, Agent, or Firm*—Fitzpatrick, Cella, Harper & Scinto

[57] ABSTRACT

A shutter charge device for lens shutter is mountable and dismountable to a camera which has a focal plane shutter and permits lens interchangeability. The device has a camera side connector member provided on a film advance shaft, the camera having mountable thereto a lens incorporating therein a lens shutter having a shutter charge lever projected outwardly of the lens barrel. The shutter charge device comprises a charge member engageable with the shutter charge lever of the camera to displace the latter lever and charge the lens shutter, and movement transmitting means adapted to be coupled to the connector member upon mounting of the shutter charge device to the camera to transmit the movement of the connector member to the charge member during film advance operation in the camera thereby to displace the charge member to a lens shutter charging position.

6 Claims, 2 Drawing Figures

SHUTTER CHARGE DEVICE FOR LENS SHUTTER IN A CAMERA HAVING A FOCAL PLANE SHUTTER AND PERMITTING LENS INTERCHANGE

BACKGROUND OF THE INVENTION

1. Field of the Invention

This invention relates to a shutter charge device for a lens shutter in a camera which has a focal plane shutter, permits lens interchange and to which a lens provided with a lens shutter may be mounted.

2. Description of the Prior Art

When photography is to be effected in the daylight by the use of a speed light as an auxiliary light source, and with a camera having a focal plane shutter and provision for lens interchange, it has heretofore been the practice to mount a lens with a lens shutter to the camera and to control the exposure by opening and closing such lens shutter. This is because the shutter speed of the focal plane shutter syntonic with the speed light is limited to, for example, 1/125 second or less, and free choice of the shutter speed is impossible.

The lens with a lens shutter of this type has proven disadvantageous in that the photographer often foregets to effect shutter charge because a shutter charge lever projected outwardly of the lens must be manually driven to effect the shutter charge.

SUMMARY OF THE INVENTION

We have conceived and contribute by the present invention a shutter charge device of the class described by means of which we are able to eliminate the above-noted disadvantage and to provide, in a camera which has a focal plane shutter and has mounted thereto a lens provided with a lens shutter having an outwardly projected charge lever, a shutter charge device which can automatically accomplish shutter charge of the lens shutter when film advance is effected.

According to the present invention, the shutter charge device for a lens shutter, mountable and dismountable with respect to a camera which has a focal plane shutter, permits lens interchange and has a camera side connector member provided on a film advance shaft, the camera being arranged to have mountable thereto a lens incorporating therein a lens shutter having a shutter charge lever projecting outwardly of the lens barrel. The shutter charge device comprises a charge member engageable with the shutter charge lever to displace the latter and charge the lens shutter, and movement transmitting means adapted to be coupled to the camera side connector member upon mounting of the shutter charge device to the camera to transmit the movement of the camera side connector member to the charge member during film advance operation in the camera thereby to displace the charge member to a position for charging the lens shutter.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein.

DECRIPTION OF THE PREFERRED EMBODIMENTS

Figure 1:
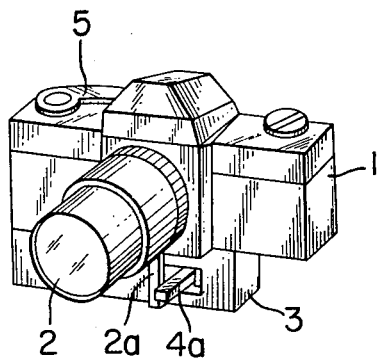
FIG. 1 is a perspective view of a camera equipped with a shutter charge device according to the present invention.

Referring to FIG. 1, we show in perspective view, a camera equipped with the shutter charge device for a lens shutter according to the present invention. In the drawing, a camera 1 has mounted thereto a lens 2 equipped with a lens shutter having a shutter charge lever 2a projecting outwardly of the lens barrel, and a shutter charge device 3 which may be mounted to the camera 1 by means of the tripod mounting screw of the camera, for example. The shutter charge device 3 has a charge projection member 4a which is slidable in response to film advance operation of the advance lever 5 of the camera 1. The charge lever 2a of the lens 2 is engageable with the charge projection member 4a outside the camera so that the shutter with which the lens is equipped may be charged by the sliding movement of the charge projection lever.

Figure 2:
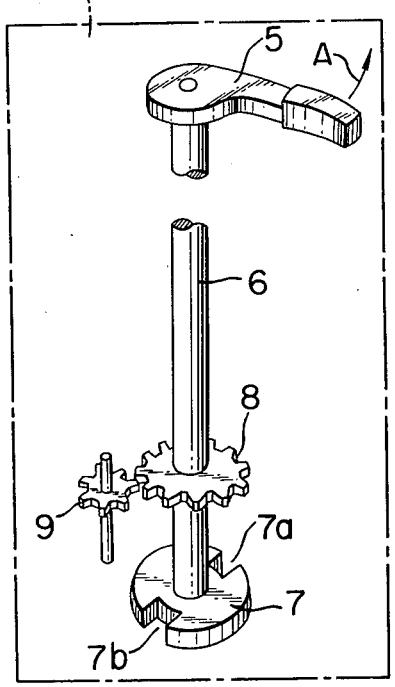
FIG. 2 is a perspective view of an interlocking mechanism in an embodiment of the present invention.
Figure 2:
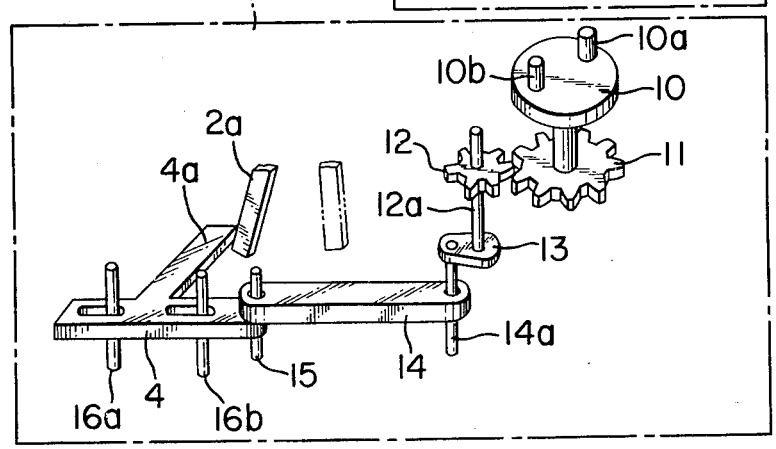

In FIG. 2, which is a perspective view showing the interlocking mechanism in the embodiment of the present invention, rotation of the film advance lever 5 is transmitted through a shift 6 to a driving member 7 formed with recesses 7a and 7b. In this case, only the rotation of the advance lever 5 in one direction (indicated by arrow A in FIG. 2) is transmitted to the shaft 6 by unshown conventional means. Gears 8 and 9 serve to drive an unshown film advance mechanism and an unshown shutter charge mechanism for the focal plane shutter.

The shutter charge device 3 has a connector member 10 which is provided with projecting pins 10a and 10b engageable in the recesses 7a and 7b, respectively, of the driving member 7 of the camera 1.

Connected to the connector member 10 through a gear 11 coaxial and integral therewith is a crank mechanism comprising a gear 12, a shaft 12a, a crank arm 13, a lever 14 and a crank pin 14a. The gear 12 is designed to make one complete rotation for a predetermined angular rotation of the advance lever 5. Thus, the rotational movement of the connector member 10 results in a reciprocal movement of the lever 14.

An actuating lever 4 illustrated in T-configuration, has one end of its cross-head connected to the lever 14 by a shaft 15, and is slidable in response to the reciprocating movement of the lever 14. The cross-head of the lever 4 is formed with two slots through each of which passes one of two shafts 16a, 16b to provide guidance for the sliding movement of the lever 4.

The extension 4a of the actuating lever 4 constitutes the charge projection member which is engageable with the charge lever 2a of the lens 2. As the advance lever 5 is rotated in the direction of the arrow A in FIG.

2 to advance the film, the driving member 7 and the connector member 10a are also rotated in the same direction and such rotation is transmitted as linear movement to the actuating lever 4 through the crank mechanism. Accordingly, the actuating lever 4 slides rightwardly, as viewed in the figure, so that the charge projection member 4a moves the charge lever 2a from the position indicated by solid line in FIG. 2 to the position indicated in phantom, thus charging the lens shutter.

By the time the film advance operation of the advance lever 5 is completed, the actuating lever 4 will have been returned to its original position by the crank mechanism.

The driving member 7 may be replaced by the advance coupling for motor drive device if the camera is of the type which permits a conventional motor drive device to be mounted thereon, in which case, the camera 1 need not be newly provided with the driving member.

From the foregoing description, it will be seen that we contribute means whereby lens shutter charge is automatically effected in response to film advance in the camera and thus, lens shutter charge is never overlooked during photography.

Further, according to the present invention, the shutter charge device is mountable and dismountable with respect to a camera having a focal plane shutter; and with the aid of such shutter charge device, the shutter charge in a camera, to which is mounted a lens shutter, is effected outside the camera in response to the film advance operation in the camera. By such apparatus there is eliminated the special need to provide a shutter charge mechanism for a lens shutter within the camera.

Moreover, the shutter charge device need be used only in the case of photography which requires a lens having a lens shutter, namely, in those cases in which photography is to be effected in the daylight by the use of a speed light.

We believe that the construction and operation of our novel shutter charge device will now be understood and that the advantages thereof will be fully appreciated by those persons skilled in the art.

We claim:

1. A shutter charge device for a lens shutter incorporated with a lens and lens barrel and having a shutter charge lever projecting outwardly of the lens barrel, the shutter charge device being mountable and dismountable on a camera which has a focal plane shutter and a connector member provided on a film advance shaft, the shutter charge device comprising:
   a charge member engageable with said shutter charge lever to displace the latter and charge said lens shutter; and
   movement transmitting means adapted to be coupled to said connector member upon mounting of said shutter charge device to said camera to transmit the movement of said connector member to said charge member during film advance operation in said camera thereby to displace said shutter charge lever and charge said lens shutter.

2. A shutter charge device according to claim 1, wherein said movement transmitting means comprise means for translating rotary movement of said connector member to linear movement of said charge member.

3. A shutter charge device according to claim 2, wherein said translating means include a shaft, a crank arm, a pin and a lever, said shaft being rotatable upon rotation of said connector member and being connected to said crank arm to rotate same about the axis of said shaft, said pin being mounted on said crank arm and displaced from said shaft wherefore rotation of said crank arm rotates said pin about the axis of said shaft, said pin engaging said lever to shift same linearly upon rotation of said crank arm, and means connecting said lever and said charge member.

4. A shutter charge device according to claim 2, wherein guide means are provided for guiding linear movement of said charge member effected by said movement transmitting means.

5. A shutter charge device according to claim 4, wherein said guide means include pin means and slot means, one of said last two means being formed on said charge member and said last two means being in mutual engagement to guide the linear movement of said charge member.

6. A shutter charge device according to claim 2, wherein said movement transmitting means include reduction means whereby said charge member completes one linear cycle for each predetermined angular movement of said connector member.

* * * * *